(12) United States Patent
Rhee et al.

(10) Patent No.: US 11,634,347 B2
(45) Date of Patent: Apr. 25, 2023

(54) SEPARABLE OUTER ENCLOSURE FOR TURBO BLOWER

(71) Applicants: Won Seok Rhee, Seoul (KR); Keon Woo Jeong, Cheongju-si (KR)

(72) Inventors: Won Seok Rhee, Seoul (KR); Keon Woo Jeong, Cheongju-si (KR)

(*) Notice: Subject to any disclaimer, the term of this patent is extended or adjusted under 35 U.S.C. 154(b) by 507 days.

(21) Appl. No.: 16/810,532

(22) Filed: Mar. 5, 2020

(65) Prior Publication Data
US 2021/0039973 A1    Feb. 11, 2021

(30) Foreign Application Priority Data

Aug. 9, 2019   (KR) .................. 10-2019-0097377

(51) Int. Cl.
*F04D 25/08* (2006.01)
*F04D 29/58* (2006.01)
(Continued)

(52) U.S. Cl.
CPC .......... *C02F 3/205* (2013.01); *F04D 29/4206* (2013.01); *F04D 29/584* (2013.01);
(Continued)

(58) Field of Classification Search
CPC ...... F04D 29/5806; F04D 5/082; F04D 29/40; F04D 29/582; F04D 29/584;
(Continued)

(56) References Cited

U.S. PATENT DOCUMENTS

| 2010/0183425 A1* | 7/2010 | Sinzaki | F24F 7/065 |
| | | | 415/60 |
| 2018/0023592 A1* | 1/2018 | Kim | H05K 7/20918 |
| | | | 415/175 |
| 2020/0132081 A1* | 4/2020 | Kim | F04D 29/5806 |

FOREIGN PATENT DOCUMENTS

| JP | 2018506679 A | 3/2018 |
| KR | 200426713 Y1 | 9/2006 |

(Continued)

*Primary Examiner* — Courtney D Heinle
*Assistant Examiner* — Andrew J Marien
(74) *Attorney, Agent, or Firm* — Fay Kaplun & Marcin, LLP (57) ABSTRACT

Provided is an outer enclosure for a turbo blower in which a turbo blower is installed, which includes a housing forming an exterior of the outer enclosure, an outside air inflow chamber which is a space partitioned in one side inside the housing and which communicates with the outside through an outside air inlet, an inverter chamber which is a space partitioned in the other side inside the housing, a motor chamber which is a space partitioned in an upper portion of a space positioned between an inverter chamber and the outside air inflow chamber, and in which a turbo blower including an intake nozzle communicating with the outside air inflow chamber is positioned, and a first refrigerant discharge port is positioned on one side, a refrigerant inflow chamber which is a space in a lower portion of the motor chamber and which communicates with the outside through a refrigerant inlet, in which the upper and lower portions of the inverter chamber are in communication with the motor (Continued)

chamber and the refrigerant inflow chamber, respectively, and the refrigerant inflow chamber is communication with the motor chamber.

6 Claims, 6 Drawing Sheets

(51) Int. Cl.
*C02F 3/20* (2023.01)
*F04D 29/42* (2006.01)
*F04D 29/62* (2006.01)
*F04D 29/70* (2006.01)
*F04D 29/66* (2006.01)
*F04D 29/40* (2006.01)

(52) U.S. Cl.
CPC ....... *F04D 29/5806* (2013.01); *F04D 29/624* (2013.01); *F04D 29/664* (2013.01); *F04D 29/701* (2013.01); *F04D 25/082* (2013.01); *F04D 29/40* (2013.01); *F04D 29/582* (2013.01)

(58) Field of Classification Search
CPC .. F04D 29/664; F04D 29/701; F04D 29/4206; F04D 29/624
See application file for complete search history.

(56) References Cited

FOREIGN PATENT DOCUMENTS

| KR | 100781298 B1 | 11/2007 | |
|----|----|----|----|
| KR | 100898911 * | 1/2008 | ............. F04D 29/58 |
| KR | 100898911 B1 | 5/2009 | |
| KR | 10-2010-0037693 A | 4/2010 | |
| KR | 101221395 B1 | 1/2013 | |
| KR | 101911754 B1 | 10/2018 | |

* cited by examiner

SEPARABLE OUTER ENCLOSURE FOR TURBO BLOWER

CROSS-REFERENCE TO RELATED APPLICATIONS

The present invention claims priority to Korean Patent Application No. 10-2019-0097377 in the Republic of Korea, the disclosures of which are incorporated herein by reference.

BACKGROUND

1. Field of the Disclosure

The present invention relates to an outer enclosure for a turbo blower in which a turbo blower is installed, and more particularly, to an outer enclosure for a turbo blower which separates air flowing into the turbo blower from cooling air for cooling devices inside the outer enclosure, to improve the performance and efficiency of the turbo blower.

2. Description of the Related Art

A turbo blower refers to a machine that rotates an impeller at high speed by using a rotational force of a motor to draw in outside air and blows it out and is used for blowing or aeration purposes.

In order to drive and control such a turbo blower, devices such as inverter and the like are required, which are generally installed in the outer enclosure in which the turbo blower is accommodated.

Due to the operation of the turbo blower, heat is generated in the devices such as turbo blower motor, inverter, and the like, and it is required to cool the devices.

However, in the related outer enclosure for a turbo blower, one flow path is often commonly used as an intake flow path of the turbo blower as well as an intake flow path of the cooling air, and accordingly, the air already used for cooling purpose is sucked into the turbo blower, or some of the outside air sucked into the turbo blower is used for cooling the inverter and the like.

In the former case, the air temperature at the entry of the turbo blower impeller may be increased, and as a result, performance of the turbo blower is deteriorated; while in the latter case, when the air quality of the outside air is poor, it is impossible to use it for a long time in consideration of dust settling in the inner flow path of the outer enclosure, and when the outside temperature itself is high, the cooling efficiency is lowered naturally.

SUMMARY

Accordingly, the present invention has been made in view of the conventional problems described above, and the main object of the present invention is to provide an outer enclosure for a turbo blower which separates air flowing into the turbo blower from air for cooling, to thus perform more efficient cooling.

In order to achieve the object above, the present invention provides an outer enclosure for a turbo blower in which a turbo blower is located, which may include a housing forming an exterior of the outer enclosure, an outside air inflow chamber which is a space partitioned in one side inside the housing and which communicates with the outside through an outside air inlet, an inverter chamber which is a space partitioned in the other side inside the housing, a motor chamber which is a space partitioned in an upper portion of a space positioned between an inverter chamber and the outside air inflow chamber, and in which a turbo blower including an intake nozzle communicating with the outside air inflow chamber is positioned, and a first refrigerant discharge port is positioned on one side, a refrigerant inflow chamber which is a space in a lower portion of the motor chamber and which communicates with the outside through a refrigerant inlet, in which the upper and lower portions of the inverter chamber are in communication with the motor chamber and the refrigerant inflow chamber, respectively, and the refrigerant inflow chamber is communication with the motor chamber.

The outer enclosure may preferably further include a back plate, a front plate, an upper plate, a lower plate, and a plurality of both side plates which form the housing, a first partition wall positioned close to the back plate inside the housing, partitioning a space for the outside air inflow chamber, a second partition wall positioned close to the front plate inside the housing to partition a space for the inverter chamber in which the inverter is disposed, a third partition wall positioned between the first partition wall and the second partition wall to vertically partition the spaces of the motor chamber and the refrigerant inflow chamber, respectively, an outside air vent positioned on the first partition wall to allow the outside air inflow chamber to be in communication with the intake nozzle of the turbo blower, a first refrigerant vent positioned on the second partition wall to allow the refrigerant inflow chamber and the inverter chamber to be in communication with each other, a second refrigerant vent positioned on the second partition wall to allow the inverter chamber and the motor chamber to be in communication with each other, and a third refrigerant vent positioned on the third partition wall to allow the refrigerant inflow chamber and the motor chamber to be in communication with each other.

The outer enclosure may preferably further include a refrigerant injector positioned outside the housing to directly inject the refrigerant into the refrigerant inflow chamber through the refrigerant inlet.

The outer enclosure may preferably further include a sound absorption partition wall positioned in the outside air inflow chamber.

Preferably, the outer enclosure may further include a filter positioned on the outside air inlet, and the outside air flowing into the outside air inflow chamber 200 may be an odor gas, and it may flow into the turbo blower through the filter to be discharged to the outside of the motor chamber.

The outer enclosure may preferably further include a second refrigerant discharge port positioned on the other side inside the motor chamber.

The back plate, the front plate, the upper plate, the lower plate, the plurality of side plates, the first partition wall, the second partition wall, and the third partition may preferably be configured to be separable and assemblable.

According to the outer enclosure for a turbo blower according to the present invention, the following effects can be obtained.

1) By separating air flowing into the turbo blower from air for cooling, more efficient cooling is possible, thereby improving the performance of the turbo blower.

2) When the quality of outside air is poor or the temperature of installation place is high, possible problem in the operation can be prevented by directly injecting the refrigerant separately.

3) The noise generated outside the outer enclosure during operation can be reduced below 75 dBm.

4) The odor gas can be sucked into the intake port, while the odor gas is not generated from the cooling outlet of the motor outside the blower since the intake port and the motor cooling port are separate from each other.

5) There is an advantage that, for the site to which access for equipment transport is limited, it is possible to transport separate pieces and assemble them at the site after the construction on the site is completed, and it is also easy to move from the site where it is initially installed to another site and re-install.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

The other objects, features and other advantages, as described above, of the present invention will be more apparent by describing in detail exemplary embodiments of the present invention with reference to the accompanying drawings. Throughout the description, the thickness of the lines, the size of the elements, and the like shown in the drawings may be exaggerated for clarity and convenience of description. In addition, terms to be described below are terms defined in consideration of functions in the present invention, which may vary according to the intention or convention of a user or an operator. Therefore, definitions of these terms need to be described based on the contents throughout the description.

In addition, the embodiments described herein are provided by way of example for the purpose of illustration and are not intended to limit the scope of the invention.

Hereinafter, an outer enclosure for a turbo blower according to an exemplary embodiment will be described in detail.

First, the configuration of the outer enclosure for a turbo blower according to the exemplary embodiment will be described in detail with reference to FIGS. 1 to 5.

In the following description, it is noted that reference to directions, such as, front, rear, left, and right are for understanding of the present invention, and the arrangement of the elements or the like are not limited to the referred directions.

The outer enclosure for a turbo blower according to an exemplary embodiment includes a housing 1, an outside air inflow chamber 200, an inverter chamber 300, a motor chamber 400, and a refrigerant inflow chamber 500.

The housing 1 forms an exterior of the outer enclosure for the turbo blower, and has a space provided therein.

The housing 1 includes a back plate 110, a front plate 120, an upper plate 130, a lower plate 140, and a plurality of side plates (e.g., left plate 150, right plate 160) on both sides.

The back plate 110 forms a back side of the housing 1, and the front plate 120 is disposed to face the back plate 110, to form a front side of the housing 1.

The upper plate 130 and the lower plate 140 are positioned on upper and lower portions of the back plate 110 and the front plate 120, respectively, to form upper and lower portions of the housing 1.

In addition, the side plates 150 and 160 on both sides are positioned on left and right sides of the housing 1, respectively, to form both sides of the housing 1.

An outer case 2, which includes an intake port formed therein, may be positioned with respect to the back plate 110 of the housing 1 in order to cover the back plate 110.

Figure 4:
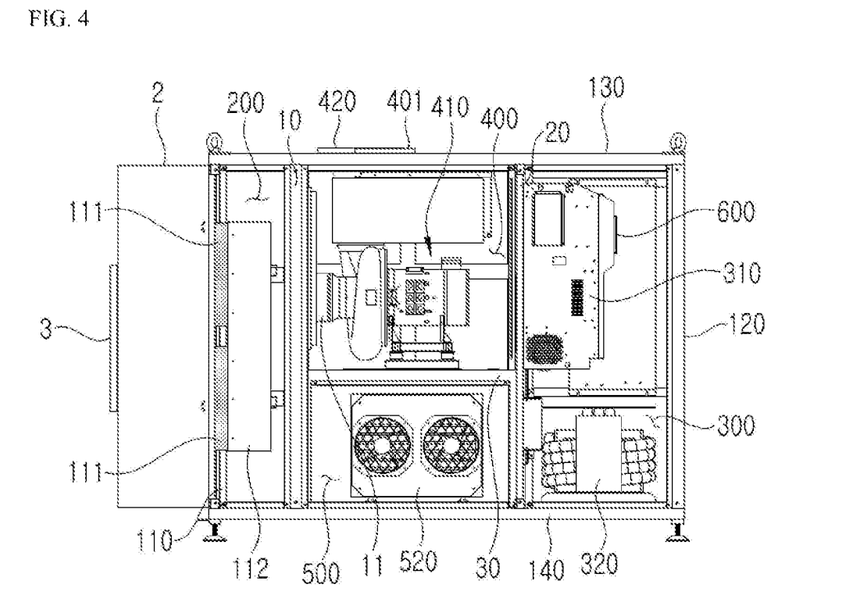
FIG. 4 is a side view showing interior of an outer enclosure for a turbo blower according to an exemplary embodiment.
Figure 5:
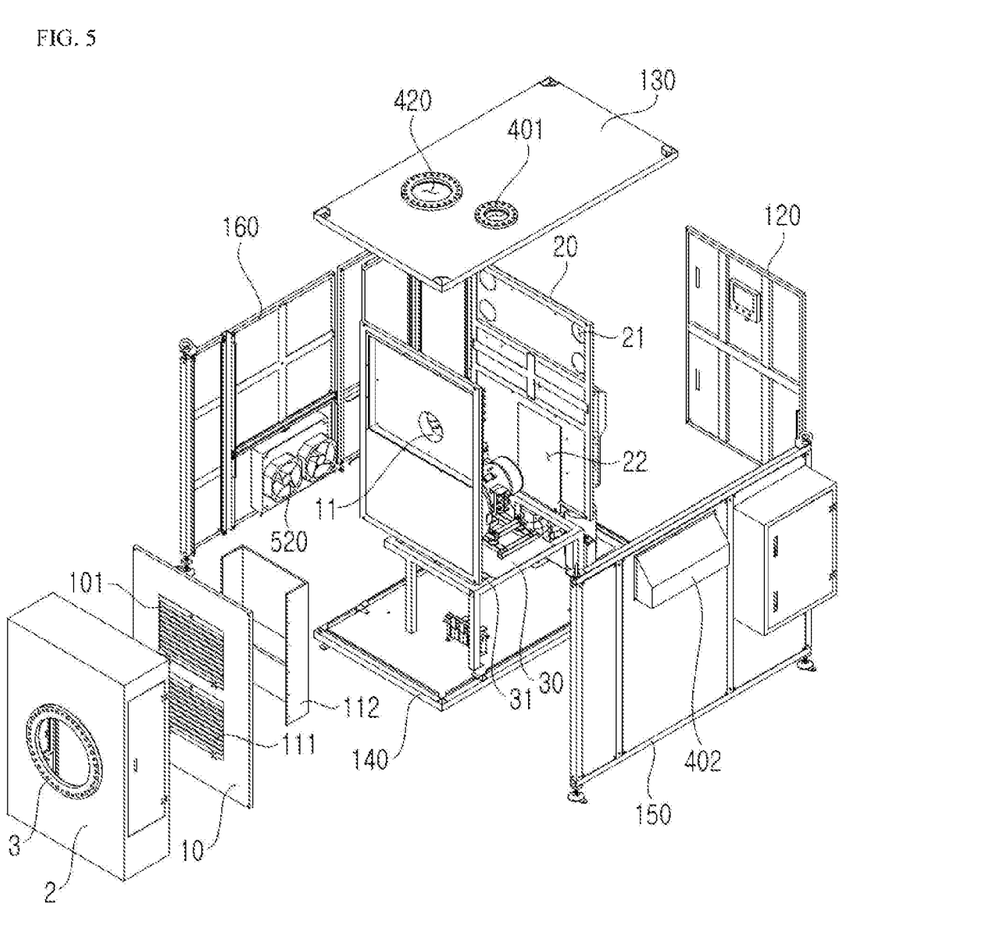
FIG. 5 is an exploded perspective view showing an outer enclosure for a turbo blower according to an exemplary embodiment.

The inner space of the housing 1 is partitioned into the outside air inflow chamber 200, the inverter chamber 300, the motor chamber 400, and the refrigerant inflow chamber 500.

The outside air inflow chamber 200 is a space positioned on one side inside the housing 1, and specifically, positioned close to the back plate 110 inside the housing 1, and is a space partitioned off by a first partition wall 10 that is spaced apart from the back plate 110 by a predetermined distance.

In front of the outside air inflow chamber 200, an outside air inlet 101, which is a partially open portion of the back plate 110, is positioned.

The interior of the outside air inflow chamber 200 is in communication with the outside through the outside air inlet unit 101, such that the air outside the outer enclosure flows into the outside air inflow chamber 200 through the outside air inlet 101.

The inverter chamber 300 is a space positioned on the other side inside the housing 1, and specifically, positioned close to the front plate 120 inside the housing 1, and is a space partitioned off by a second partition wall 20 that is spaced apart from the front plate 120 by a predetermined distance.

A harmonic filter 320 and an inverter 310 are disposed inside the inverter chamber 300 and are connected to a turbo blower 410. On one side of the inverter 310, a controller 600 for controlling the inverter 310 and the harmonic filter 320 may be installed.

Another space is formed between the first partition wall 10 and the second partition wall 20 that partition the outside air inflow chamber 200 and the inverter chamber 300 respectively, and the motor chamber 400 and the refrigerant inflow chamber 500 are positioned in that space.

A third partition wall 30 is positioned between the first partition 10 and the second partition 20 that partition the inverter chamber 300 and the outside air inflow chamber 200 respectively, while being orthogonal to the first partition wall 10 and the second partition wall 20 to vertically partition the space.

The upper space of the vertically-partitioned space is the motor chamber 400, and the lower space is the refrigerant inflow chamber 500.

The turbo blower 410 is disposed in the motor chamber 400, and an outside air discharge port 420, a first refrigerant discharge port 401, and a second refrigerant discharge port 402 are positioned therein.

Figure 1:
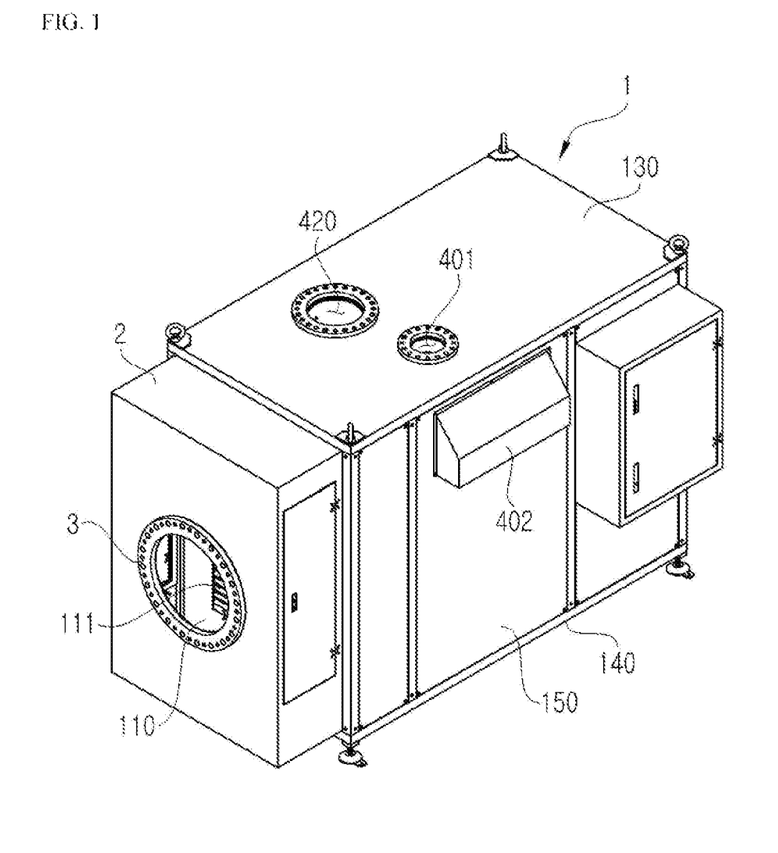
FIG. 1 is a perspective view showing an outer enclosure for a turbo blower according to an exemplary embodiment.
Figure 2:
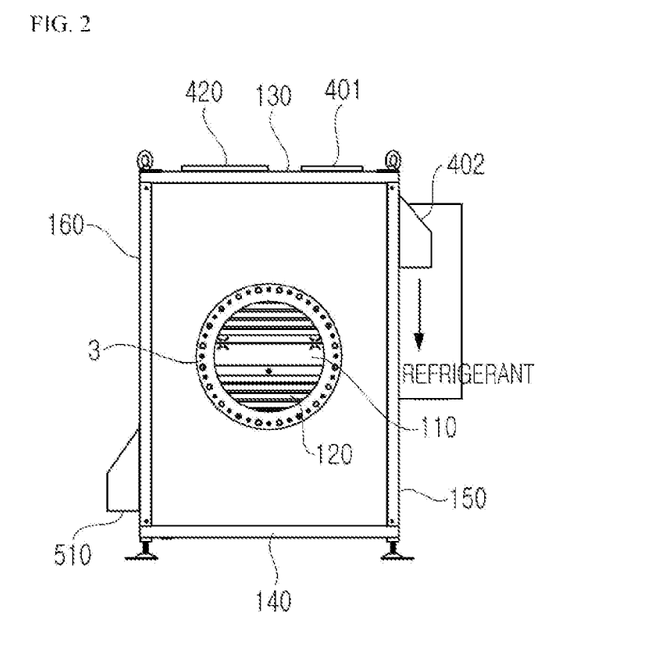
FIG. 2 is a rear view showing an outer enclosure for a turbo blower according to an exemplary embodiment.

Specifically, the outside air discharge port 420 and the first refrigerant discharge port 401 may be formed on the upper plate 130 that forms an upper portion of the motor chamber 400, and the second refrigerant discharge port 402 may be formed on the left side plate 150 that forms a side of the motor chamber 400, but these are not limited thereto.

The refrigerant inflow chamber 500 is a space located under the motor chamber 400, which is in communication with the outside through a refrigerant inlet 510 located at one side thereof, and the refrigerant flows into the refrigerant inflow chamber 500 through the refrigerant inlet 510.

Herein, the refrigerant may be an externally-introduced air, but is not limited thereto, and includes all other gases that provide cooling effects.

In addition, an intake fan 520 may be installed in the refrigerant inlet 510 to cause the refrigerant to flow into the refrigerant inflow chamber 500, and the operation of the intake fan 520 is controlled by the controller 600.

Figure 3:
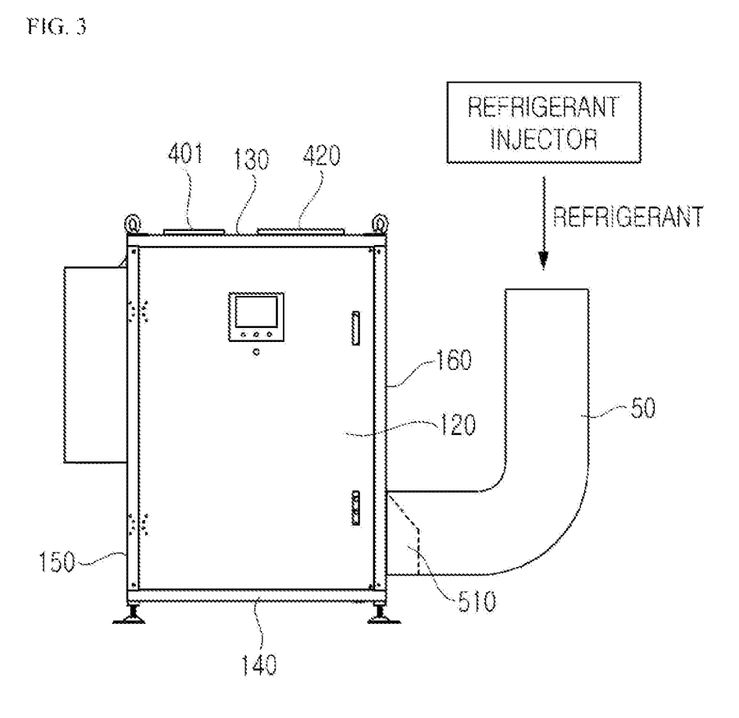
FIG. 3 is a front view showing an outer enclosure for a turbo blower according to an exemplary embodiment, showing a refrigerant injector connected thereto.

Further, as shown in FIG. 3, a refrigerant injector may be provided, which may be connected to the refrigerant inlet 510 through an intake duct 50 from outside the housing 1 to directly inject a refrigerant into the refrigerant inflow chamber 500.

The configuration of the refrigerant injector is not particularly limited, and may be configured as an air conditioner, an air compressor, and the like for injecting refrigerant. This allows more efficient cooling than by simply introducing outside air for cooling, and when the quality of the outside air at the location where the outer enclosure is installed is poor, or when the temperature is so high that is not proper to use the outside air as a refrigerant, it is possible to cool by directly injecting a separate refrigerant, thereby enabling installation and use even at a high-temperature site, and also preventing contamination inside the outer enclosure.

The partition walls that partition each space will be described.

An outside air vent 11, a portion of which is open, is positioned in the first partition wall 10, and the outside air vent 11 is connected to an intake nozzle of the turbo blower 410 positioned in the motor chamber 400.

A first refrigerant vent 22 is positioned on a lower portion of the second partition wall 20 such that the refrigerant inflow chamber 500 and the inverter chamber 300 are in communication with each other, and a second refrigerant vent 21 is positioned on an upper portion of the second partition wall 20 such that the inverter chamber 300 and the motor chamber 400 are in communication with each other.

In addition, a third refrigerant vent 31 is positioned on the third partition wall 30 such that the refrigerant inflow chamber 500 and the motor chamber 400 are in communication with each other.

Therefore, the upper and lower portions of the inverter chamber 300 are in communication with the motor chamber 400 and the refrigerant inflow chamber 500, respectively, and the refrigerant inflow chamber 500 is in communication with the motor chamber 400.

In addition, as shown in FIG. 5, the plates 110, 120, 130, 140, 150, and 160 forming the housing 1, and the partition walls 10, 20, and 30 partitioning the interior or the housing 1 are configured to be separable and assemblable.

That is, the back plate 110, the front plate 120, the upper plate 130, the lower plate 140, the right plate 160 and the left plate 150 forming the housing 1, and the first partition wall 10, the second partition wall 20, and the third partition wall 30 partitioning the interior or the housing 1 are configured to be separable and assemblable.

In the relevant art in which the outer enclosure for a turbo blower is installed on-site at the time of construction of that site, the outer enclosure is formed integrally.

However, the outer enclosure for a turbo blower according to the embodiments described above is configured such that each of the plates and partition walls that form the housing 1 are separable and assemblable, and accordingly, there is an advantage in that it is possible to transport separate pieces and assemble them at the site after the construction on the site has been completed, and also easy to move from the site where the enclosure is initially installed to another site and re-install.

The outside air inlet 101 may be provided with a filter 111 for purifying the outside air flowing from the outside. As a result, it is possible to utilize odor gas and the like by flowing it into the outer enclosure as the outside air.

The odor gas refers to air containing odor components, and the odor gas may be classified into high concentration odor gas and low concentration odor gas.

For the high concentration odor gas, air is classified as the high concentration malodorous gas when any one of the following conditions is met: 1) combined odor magnification of the measuring point exceeds 100; 2) estimated odor magnification value compared to minimum detection concentration among odor components is equal to or greater than 500; and 3) THC among odor components is equal to or greater than 20 PPM.

Examples of facilities that generate such a high concentration odor gas include screen equipment, organic/alkali/NF collection tanks, organic anoxic tanks, sludge thickening tanks/storage tanks, NF reaction/precipitation tanks, and the like.

All the other odor gases not classified as the high concentration odor gas are classified as the low concentration odor gases, and examples of facilities that generate low concentration odor gas include acid, HF collection tank/reaction tank/sedimentation tank, chemical tank, sludge dehydration chamber/cake discharge chamber, sewage treatment facility (PCF, GCF, ACF, and the like), discharge facility, and the like.

When the filter 111 is provided in the outside air inlet 101, the outer enclosure according to the present embodiment may be installed in the facility in which the odor gas is generated, to purify and discharge the odor gas generated from the facility.

In addition, a sound absorption partition wall 112 is positioned inside the outside air inflow chamber 200, or more specifically, in back of the outside air inlet 101 of the outside air inflow chamber 200 is disposed. As a result, the noise caused by the outside air flowing into the outside air inflow chamber 200 through the outside air inlet 101 can be reduced to 75 dBm or less, and a user can be protected from the rotating impeller of the turbo blower 410 when replacing the filter 111, and particles settling on the filter 111 can be prevented from entering the impeller.

Figure 6:
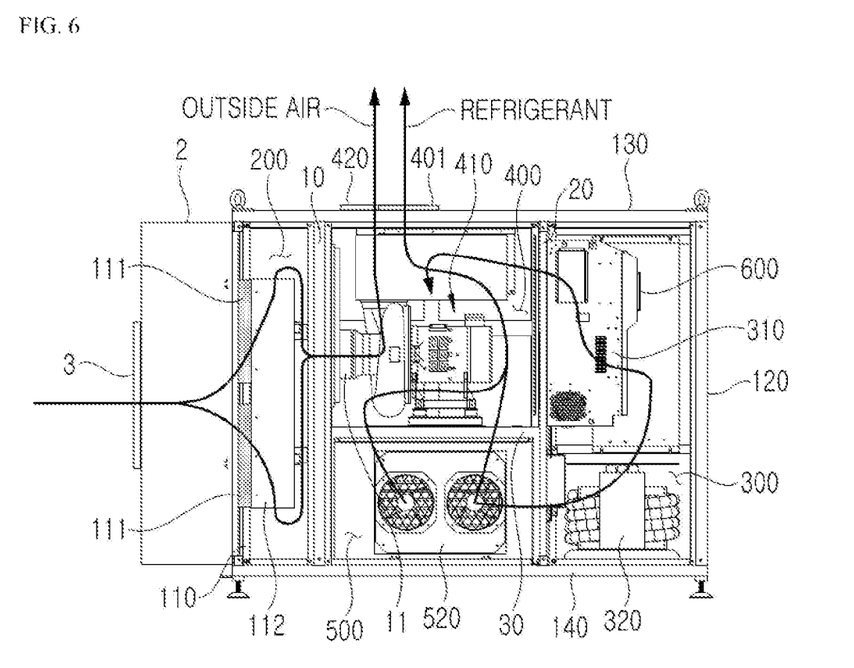
FIG. 6 is a side view showing an interior of an outer enclosure for a turbo blower according to an exemplary embodiment, showing a flow path for the outside air and refrigerant.

Hereinafter, the operation of the outer enclosure for a turbo blower according to the exemplary embodiment will be described with reference to FIG. 6. In FIG. 6, the thick arrows show flow paths of outside air (odor gas) and refrigerant.

First, as the harmonic filter 320 and the inverter 310 are operated by the controller 600, the turbo blower 410 connected thereto is driven.

In addition, in addition to controlling the harmonic filter 320 and the inverter 310, the controller 600 operates the intake fan 520.

A negative pressure is generated in the outside air inflow chamber 200 by the operation of the turbo blower 410, and as a result, the outside air is sucked through the inlet 3 of the outer cover 2, and sucked into the motor of the turbo blower 410 while passing through the filter 111 positioned in the back plate 110. While the motor chamber of the related turbo blower forms a negative pressure, in the present invention, in order to cool the motor efficiently, the air pressure of the motor chamber 400, into which the cooling air for motor is sucked, forms a positive pressure due to the injection of air from the intake fan 510.

The outside air passed through the filter 111 does not flow directly into the outside air vent 11 of the first partition wall 10, but changed in its flow path by the sound absorption partition wall 112 to be passed through the upper and lower portions of the outside air inflow chamber 200 and flow into the outside air 11, and then discharged to the outside air outlet 420 at the upper portion of the motor chamber 400 through the turbo blower 410.

By the operation of the inverter 310 and the turbo blower 410 as described above, heat is generated in the motors of the inverter 310 and the turbo blower 410.

Meanwhile, by the operation of the intake fan 520, the air from outside may flow inside, or the refrigerant from the refrigerant injector may directly flow through the intake duct 50 into the refrigerant inflow chamber 500 through the refrigerant inlet 510.

Some of the refrigerant flowing into the refrigerant inflow chamber 500 passes through the first refrigerant vent 22 positioned at a lower portion of the second partition wall 20 and then flows into the inverter chamber 300, and the remainder of the refrigerant flows into the motor chamber 400 through the third refrigerant vent 31 positioned on the third partition wall 30.

The refrigerant flowing into the inverter chamber 300 flows upwards in the inverter chamber 300 to cool the harmonic filter 320 and the inverter 310, passes through the second refrigerant vent 21 positioned at the upper portion of the second partition wall 20, flows into the motor chamber 400 to further cool the motor chamber 400, and is discharged to the second refrigerant discharge port 402 through the duct at the upper portion of the motor chamber 400 (see FIG. 2).

In addition, the refrigerant flowing into the motor chamber 400 through the third refrigerant vent 31 flows upwards in the motor chamber 400 to cool the motor of the turbo blower 410 and is discharged through the first refrigerant discharge port 401.

As described above, according to the outer enclosure for a turbo blower according to the present invention, the following effects can be obtained.

1) By separating air flowing into the turbo blower from air for cooling, more efficient cooling is possible, thereby improving the performance of the turbo blower.

2) The efficient cooling is possible by directly injecting a separate refrigerant, and cooling performance can be maintained by directly injecting refrigerant when the quality of outside air is poor, and contamination inside the outer enclosure can be prevented.

3) The noise generated inside the outer enclosure can be reduced.

4) The outer enclosure for a turbo blower can be installed in a facility where odor gas is generated to intake odor gas generated from the facility.

5) There is an advantage that it is possible to transport separate pieces and assemble them at the site after the construction on the site is completed, and it is also easy to move from the site where it is initially installed to another site and re-install.

While exemplary embodiments of the present invention have been described above, the present invention is not limited to the specific embodiments described above. That is, those skilled in the art to which the present invention pertains may make numerous changes and modifications to the present invention without departing from the spirit and scope of the appended claims, and it should be considered that all such appropriate changes and equivalents of modifications are intended to fall within the scope of the present invention.

What is claimed is:

1. An outer enclosure configured to house a turbo blower, the outer enclosure comprising:
   a housing forming an exterior of the outer enclosure;
   an outside air inflow chamber which is a space partitioned in a first side of the housing and which communicates with outside air through an outside air inlet;
   an inverter chamber which is a space partitioned in a second side of the housing;
   a motor chamber which is a space partitioned in an upper portion of a space positioned between the inverter chamber and the outside air inflow chamber, and in which the turbo blower including an intake nozzle communicating with the outside air inflow chamber is positioned, and a first refrigerant discharge port is positioned on a third side of the housing;
   a refrigerant inflow chamber which is a space in a lower portion of the motor chamber and which communicates with the outside through a refrigerant inlet;
   a back plate, a front plate, an upper plate, a lower plate, and a plurality of side plates, which form the housing;
   a first partition wall positioned adjacent to the back plate inside the housing, partitioning a space for the outside air inflow chamber;
   a second partition wall positioned adjacent to the front plate inside the housing, partitioning a space for the inverter chamber in which an inverter is disposed;
   a third partition wall positioned between the first partition wall and the second partition wall to vertically partition the spaces of the motor chamber and the refrigerant inflow chamber, respectively;
   an outside air vent positioned on the first partition wall to allow the outside air inflow chamber to be in communication with the intake nozzle of the turbo blower;
   a first refrigerant vent positioned on the second partition wall to allow the refrigerant inflow chamber and the inverter chamber to be in communication with each other;
   a second refrigerant vent positioned on the second partition wall to allow the inverter chamber and the motor chamber to be in communication with each other; and
   a third refrigerant vent positioned on the third partition wall to allow the refrigerant inflow chamber and the motor chamber to be in communication with each other,
   wherein the outside air is sucked into the intake nozzle of the turbo blower through the outside air vent of the outside air inflow chamber by the operation of the turbo blower;
   some of refrigerant flowing into the refrigerant inflow chamber flows into the motor chamber through the third refrigerant vent to cool a motor of the motor chamber; and
   the remainder of the refrigerant that flows into the refrigerant inflow chamber flows into the inverter chamber through the first refrigerant vent to cool the motor chamber while flowing upwards, and flows into the motor chamber through the second refrigerant vent to further cool a motor of the turbo blower.

2. The outer enclosure of claim 1, further comprising a refrigerant injector positioned outside of the housing to directly inject refrigerant into the refrigerant inflow chamber through the refrigerant inlet.

3. The outer enclosure of claim 1, further comprising a sound absorption partition wall positioned inside the air inflow chamber.

4. The outer enclosure of claim 1, further comprising:
a filter positioned on the outside air inlet,
wherein the outside air flowing into the outside air inflow chamber is an odor gas, and flows into the turbo blower through the filter and is discharged outside of the motor chamber.

5. The outer enclosure of claim 1, further comprising a second refrigerant discharge port positioned on the second side inside the motor chamber.

6. The outer enclosure of claim 1, wherein the back plate, the front plate, the upper plate, the lower plate, the plurality of side plates, the first partition wall, the second partition wall, and the third partition wall are configured to be separable and assemblable.

\* \* \* \* \*

UNITED STATES PATENT AND TRADEMARK OFFICE
CERTIFICATE OF CORRECTION

PATENT NO. : 11,634,347 B2
APPLICATION NO. : 16/810532
DATED : April 25, 2023
INVENTOR(S) : Rhee It is certified that error appears in the above-identified patent and that said Letters Patent is hereby corrected as shown below:

On the Title Page

Item (12):
Rhee et al.
Should read:
Rhee

Item (72) Inventors:
Won Seok Rhee, Seoul (KR); Keon Woo Jeong, Cheongju-si (KR)
Should read:
Won Seok Rhee, Seoul (KR)

Signed and Sealed this
Second Day of July, 2024

Katherine Kelly Vidal
*Director of the United States Patent and Trademark Office*